(No Model.)
F. KORTICK.
COMBINATION TOOL.
No. 431,662. Patented July 8, 1890.
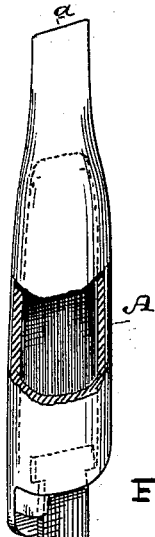
FIG. 1.
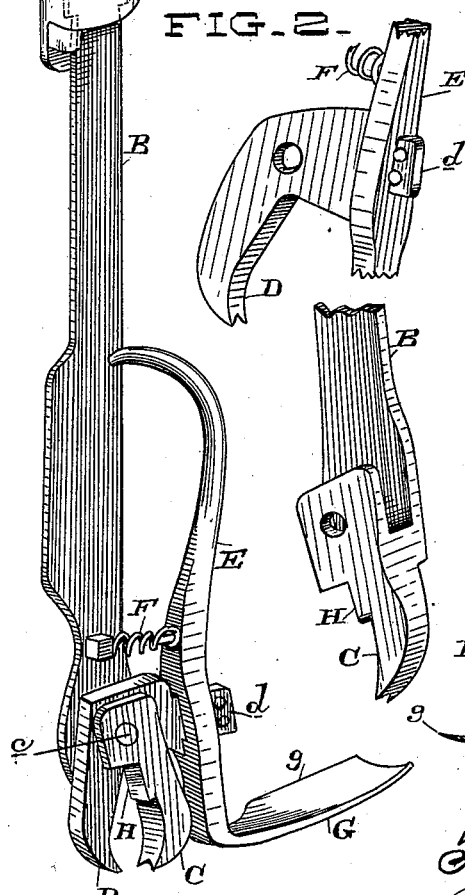
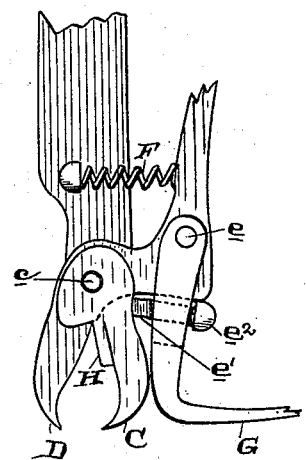
FIG. 2.   FIG. 3.
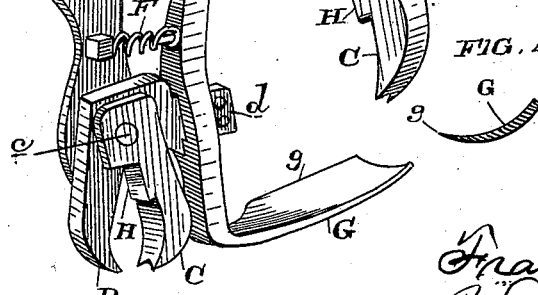
FIG. 4.
Witnesses,
Geo. H. Strong
Inventor,
Frank Kortick
By Dewey & Co.
Attys

UNITED STATES PATENT OFFICE.

FRANK KORTICK, OF SAN FRANCISCO, CALIFORNIA.

COMBINATION-TOOL.

SPECIFICATION forming part of Letters Patent No. 431,662, dated July 8, 1890.

Application filed July 19, 1889. Serial No. 318,047. (No model.)

*To all whom it may concern:*

Be it known that I, FRANK KORTICK, of the city and county of San Francisco, State of California, have invented an Improvement in Combination-Tools; and I hereby declare the following to be a full, clear, and exact description of the same.

My invention relates to that class of tools or implements which are designed for a variety of purposes, and are commonly known as "combination-tools;" and my invention consists in the novel constructions, arrangements, and combinations of parts, hereinafter fully described, and specifically pointed out in the claims.

Referring to the accompanying drawings for a more complete explanation of my invention, Figure 1 is a perspective view of my combination-tool. Fig. 2 is a perspective view of the jaws C and D, showing them separated. Fig. 3 is a modification. Fig. 4 is a cross-section of foot G.

A is the stock of the implement, made hollow, so as to receive the shank B, which is adapted to move out and in in the stock in the ordinary manner of nail-pullers of this class. At the lower end of this shank is attached or formed the fixed jaw C of the nail-puller, and on a pin $c$ is pivoted the swinging jaw D of the nail-puller, said jaw being between the upper end or body of the fixed jaw and the lower end of the shank, and directly opposed to said fixed jaw. Both jaws are notched to better grip the nail-head. The swinging jaw is provided with a body extension $d$, upon which is secured the handle E, which extends upwardly opposite the shank and to one side thereof, so that it and the shank may be grasped by the hand after the manner of ordinary shears. A spring F, located between the shank and the handle, holds these parts normally separated, so as to hold the jaws of the nail-puller apart. The lower end of the handle is provided with a foot G, extending at right angles therefrom and in line with the jaws of the nail-puller. This foot forms the fulcrum on which the implement works when acting in the manner of the ordinary nail-puller, and in order to make this foot subserve a secondary purpose I grind or sharpen down one of its edges $g$ to make a scraping-knife for erasing the marks on the box preparatory to re-marking it.

The fixed jaw of the nail-puller is provided with a cutting-edge H at its top, against which the opposing edge of the moving jaw operates shearwise, so that said surfaces act as a wire-cutter.

The stock A of the implement has its upper end $a$ drawn down to a point forming a wedge for the purpose of prying up the bands, clamps, or hoops of the box.

The various uses of the implement or tool are as follows: As a nail-puller it is held in a vertical position with its normally-separated jaws directly over the nail to be drawn and the foot resting upon the box. The stock, which is in an elevated position, is now suddenly forced or driven down to act as a hammer on the shank in the usual manner and drive the points of the jaws down into the material of the box on each side of the nail. Then the shank and handle E are grasped, so as to positively draw the jaws together to clamp the nail-head, thereby avoiding any slipping. The implement is now turned over to an angle, so that bearing on the foot G as a fulcrum the closed jaws are tightened upon the head of the nail, and said nail by the continued movement of the tool is extracted.

As a wire-cutter the shank and handle E are grasped like the handles of any shear-like implement and the wire is cut off between the cutting-surfaces of the jaws.

As a mark-scraper, the implement is turned sidewise and the shapened edge of the foot is used as a knife to erase the marks.

As a prier for the bands or hoops of the boxes the upper pointed end of the stock A is introduced under the said bands and they are thereby pried off.

In Fig. 3 I have a slight modification of the tool. The foot G, instead of being rigidly connected to or formed with the handle E, is connected with it by a pivoted joint at $e$, and said foot is held close up to the fixed jaw C by a fixed guide-pin $e'$, over which the inner end of the foot is forked, said pin having a head $e^2$. In this construction the foot G does not turn with the handle E about the pivotal center of the swinging jaw, but is free to be held close into the fixed jaw by the pin $e'$ instead of being thrown away from it. The advantage of this is that the fulcrum-point is kept close up to the jaw, requiring less movement of the implement and giving greater purchase.

Having thus described my invention, what I claim as new, and desire to secure by Letters Patent, is—

1. The combination of the shank having the fixed nail-pulling jaw on its lower end, the swinging jaw carried by the shank and opposing the fixed jaw, the handle connected with said swinging jaw, whereby the jaws may be clamped on the nail-head, the fulcrum-foot pivotally connected with the lower end of the handle, and the hollow stock fitted to and sliding on the shank to serve as a hammer, substantially as described.

2. The combination of the shank having the fixed nail-pulling jaw on its lower end, the swinging jaw carried by the shank and opposing the fixed jaw, the handle connected with said swinging jaw, whereby the jaws may be clamped on the nail-head, the fulcrum-foot pivotally connected with the lower end of the handle, the guide-pin for holding said foot in position, and the hollow stock fitted to and sliding on the shank and serving as a hammer, substantially as described.

3. The combination of the shank having the fixed nail-pulling jaw on its lower end, the swinging jaw carried by the shank and opposing the fixed jaw, the handle connected with said swinging jaw, whereby the jaws may be clamped on the nail-head, the fulcrum-foot pivotally connected with the lower end of the handle, having one of its edges sharpened to serve as a scraper, the guide-pin for holding said foot in position, and the hollow stock fitted to and sliding on the shank and serving as a hammer, substantially as described.

In witness whereof I have hereunto set my hand.

FRANK KORTICK.

Witnesses:
S. H. NOURSE,
H. C. LEE.